United States Patent Office 2,911,363
Patented Nov. 3, 1959

2,911,363

PROCESS FOR REMOVING PHENOL

Lehr F. Kissling, Wadsworth, Ohio, assignor to Columbia-Southern Chemical Corporation, County of Allegheny, Pa., a corporation of Delaware No Drawing. Application May 20, 1957
Serial No. 660,080

10 Claims. (Cl. 210—32)

The instant invention pertains to a novel process for removing phenols from aqueous acidic media by anion-exchange resins.

Presence of phenols such as phenol in aqueous acidic media raises a problem inasmuch as such media, for instance, cannot be directly sewered due to pollution laws. Prior to this invention, it has therefore been necessary to remove phenol by chemical treatment, such as with alkaline materials, before sewering. Chemical treatment of this character, however, has resulted in the loss of the acidic values in the media.

In accordance with the present invention, a simple and efficient process is provided whereby phenols may be selectively separated from aqueous acidic media without destroying the acid equivalents of the media. Now phenol may be selectively removed from hydrochloric acid, such as that produced as a by-product of phenol chlorination, while recovering hydrochloric acid.

Aqueous acidic media may be rendered free of phenols according to this invention by treating the media with an anion-exchange resin, such as by intimately contacting the resin with the aqueous media. It has further been found that repeated use of the anion-exchange resin to remove the phenol from aqueous media is possible by regeneration of the resin with a water soluble hypochlorite, e.g. sodium hypochlorite.

Weak and strongly basic synthetic (carbonaceous) insoluble anion-exchange resins including those described in United States Patents No. 2,543,666; 2,591,573; 2,630,-429; and 2,632,000 are employed. Those insoluble anion-exchange resins which possess an active quaternary ammonia or amine group such as described in United States Patents No. 2,591,573 and 2,630,429 appear most effective for the purposes of this invention. Of these, anion-exchange resins are preferred which are aromatic, cross-linked vinyl copolymers containing substituents conforming to the following general formula:

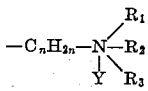

wherein $n$ is a whole integer of value 1 to 4 inclusive; $R_1$, $R_2$, and $R_3$ are hydrocarbon groups; and $Y$ is an anion such as chloride, sulfate or hydroxyl ion. United States Patent No. 2,591,573 describes more fully such resins.

Practice of this invention is possible by a variety of expedients which provide for intimately contacting an anion-exchange resin of the type hereinbefore set forth with a phenol-containing aqueous acidic medium and thereafter recovering the treated medium, as by simple separation from the insoluble resin. This is efficiently accomplished in one case, by flowing the liquid medium through a bed of the anion-exchange resin, more particularly a confined bed such as is provided by packing a suitable tower area. After the resin has taken up its phenol capacity, it is regenerated by treatment with a water soluble hypochlorite such as sodium hypochlorite.

A preferred embodiment includes alternately passing the phenol-containing medium through a bed of the anion-exchange resin until the resin has essentially reached its phenol take-up capacity and then discontinuing the flow of the medium while a solution of sodium hypochlorite is passed through the bed. Afterwards, the flow of acidic media is resumed until regeneration is again required and the cycle of steps is repeated.

The alternate passage of phenolic media and regenerating material is often performed by countercurrent flow of the respective liquids. For example, the phenol containing medium may be passed unidirectionally and downwardly through the resin bed until the phenol is no longer being selectively removed, or more preferably until the efficiency of the bed has decreased to the point where "fresh" resin is advisable. Then, after halting the flow of this medium, and normally draining the bed, aqueous sodium hypochlorite is forced upwardly through the bed until the resin has been adequately regenerated at which time this resin treatment is stopped.

Phenol concentration, the specific anion-exchange resin, and the rate of flow of the acidic media all govern the frequency with which the regeneration cycle is employed. Anion-exchange resins of the character described in United States Patent No. 2,591,573 remove approximately 150–250 grams of phenol per cubic foot of resin bed in a tower-type operation. These resins, and those of equivalent capacity, therefore usually are regenerated after removing at least about 100 grams, more notably between at least 150–200 grams of phenol per cubic foot of resin bed, and before the capacity of the bed is exceeded.

In the aforedescribed manner, aqueous acidic liquids especially those containing minor concentrations of a phenol, e.g. less than about 1000 parts per million phenol by weight of the liquid are treated to selectively remove the phenol while simultaneously providing a substantially phenolic-free acidic media. By "acidic media," a liquid having a pH below 7, preferably a pH of 5 or less, is intended.

One aqueous acid media which is treated in accordance with the invention is hydrochloric acid resulting from chlorination of phenol such as in the preparation of dichlorophenol. Even after physical purification of this acid, it contains up to about 500 parts per million phenol by weight. When passed through a bed of anion-exchange resin, an acid product containing less than 10 parts per million phenol by weight, is provided, and under optimum conditions a product containing substantially no phenol can be obtained.

Phenols removed from acid media such as hydrochloric acid include phenol, ortho-cresol, meta-cresol, para-cresol, the various xylenols such as 2,5-dimethylphenol, 2,6-dimethylphenol and 2,3-dimethylphenol, pentamethylphenol, the chlorophenols among which are 2,4-dichlorophenol, 2,6-dichlorophenol, 2,4,5-trichlorophenol and pentachlorophenol, polyphenols illustrative of which are catechol, resorcinol, mesorcinol, pyrogall and tetrahydroxybenzene and other hydroxybenzenes.

The following examples illustrate the manner in which the invention is practiced.

EXAMPLE I

A glass tube 5 feet high and having an inner diameter of one inch was filled with about 30 inches of an anion-exchange resin described in United States Patent No. 2,591,573 ("Amberlite" IRA–410). This resin was disposed in the tube over a 2 inch sand underbed. The liquid level of the aqueous acidic media being treated was maintained at 2 to 3 inches above the upper end of the resin bed. Gravity feed, controlled by a screw clamp at the bottom of the tube, was employed to regulate the passage of the aqueous medium through the bed. Room temperature, about 21° C., was used.

Hydrochloric acid, 20° Bé., containing 505 parts per million by weight of the acid was passed downwardly through the resin bed at a flow rate of about 0.8 to 0.9 gallon per square foot of bed per minute. This feed was continued until the bed had removed an average of about 190 grams of phenol per cubic foot of resin. When such quantity had been removed, the acid feed was discontinued and the bed drained after which an aqueus solution of sodium hypochlorite containing 7 percent sodium hypochlorite by weight was forced upwardly through the resin bed. Some 20 gallons per cubic foot of resin bed of this solution was used.

This procedure was repeated 14 times to illustrate continual operation and regeneration of the resin bed. Typical of the data observed during the performance of these repeated treatments is that of the 14th consecutive acid throughput (after 13 regenerations). It is given in the following table.

Table I

| Total acid through bed in cubic centimeters | 690 | 1,600 | 2,455 | 3,125 | 3,900 |
|---|---|---|---|---|---|
| Phenol in treated acid, p.p.m. | 1 | 1 | 2 | 8 | 25 |

EXAMPLE II

Using the procedure and apparatus of Example I, hydrochloric acid containing 18 percent by weight of hydrogen chloride and 417 parts per million of phenol was passed through the resin bed at the rate of 0.35 gallon per cubic foot of resin per minute. The effluent acid, after 3 liters of the acid had been passed through the bed, contained 17 parts per million of phenol by weight of the acid. During the earlier stages of the treatment, the acid contained even less phenol.

Besides aqueous sodium hypochlorite solutions, other aqueous hypochlorite solutions such as solutions of calcium hypochlorite, potassium hypochlorite, and other water soluble alkali-metal and alkali-earth metal hypochlorites are included. Normally, the hypochlorite solution is dilute, containing between about 3 to 12 percent by weight of the water soluble hypochlorite.

Regeneration with aqueous sodium hypochlorite solution, for example, continues until the anion-exchange resin is essentially returned to its original state; that is, until substantially all, or at least a major portion of the phenol is removed. Completion of regeneration is visually evidenced by a change in color of the resin, usually from a dark brown to a light straw color (the original color of the resin) in the case of the preferred anion-exchange resins.

A further refinement in the mode of continually operating a bed of anion-exchange resin in the treatment of aqueous acid media includes interposing water washes of the bed between the respective acid and regeneration cycles. After finishing the acid treatment phase, the bed is washed with water until the effluent wash stream has a pH of from 5 to 7. Then, at the conclusion of the regeneration cycle, the bed is again washed with water to remove any residual sodium hypochlorite. Such washes enhance the efficiency of the entire operation.

The present application is a continuation-in-part of my prior application Serial No. 383,127, filed September 29, 1953, now abandoned.

Although the invention has been described with reference to specific details of certain embodiments, such details are not intended to be limitations upon the scope of the invention except insofar as they are recited in the appended claims.

I claim:

1. In the method of removing a phenol from aqueous acidic media which comprises contacting an aqueous acidic media containing a phenol with an anion-exchange resin to remove selectively the phenol from the media, regenerating the resin having phenol present therein as a consequence of such selective removal and contacting regenerated resin with further aqueous acidic media containing a phenol for the purpose of selectively removing the phenol, the improvement which comprises regenerating the resin by treatment with an aqueous solution of a water soluble hypochlorite.

2. The method of removing phenol from aqueous acidic media containing a minor proportion of phenol which comprises in repeated sequence contacting an insoluble anion-exchange resin with the media, separating the media from the resin and regenerating the resin with an aqueous solution of a water soluble hypochlorite.

3. The method of claim 2 wherein the hypochlorite is sodium hypochlorite.

4. The method of regenerating an anion-exchange resin containing phenol which comprises treating the resin with an aqueous solution of a water soluble hypochlorite, said regeneration improving the capacity of the resin to remove phenol from aqueous acidic media.

5. The method of claim 4 wherein the hypochlorite is sodium hypochlorite.

6. The method of claim 4 wherein the aqueous solution contains between about 3 and 12 percent water soluble hypochlorite by weight.

7. The method of removing phenol from aqueous acidic media having a pH below 5 and containing phenol which comprises alternately treating said media with an insoluble anion-exchange resin, and regenerating the resin with an aqueous solution of a water soluble hypochlorite.

8. The method of removing phenol from aqueous acidic media containing up to about 1000 parts per million phenol by weight which comprises in repeated sequence contacting an anion-exchange resin with said acidic phenol-containing media, separating the media from the resin whereby to obtain a substantially phenol-free acidic media and regenerating the resin with an aqueous solution of a water soluble hypochlorite.

9. The method of claim 8 wherein said recovered substantially phenol-free acidic media contains less than 10 parts per million phenol by weight.

10. The method of removing phenol from hydrochloric acid containing a minor proportion of phenol which comprises in repeated sequence contacting an insoluble anion-exchange resin with the acid, separating the acid and resin and regenerating the resin with an aqueous solution of a water soluble hypochlorite.

No references cited.